United States Patent
Snaman, Jr. et al.

(10) Patent No.: US 6,243,744 B1
(45) Date of Patent: *Jun. 5, 2001

(54) COMPUTER NETWORK CLUSTER GENERATION INDICATOR

(75) Inventors: William Snaman, Jr., Nashua; Wayne Cardoza, Amherst, both of NH (US)

(73) Assignee: Compaq Computer Corporation, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,748

(22) Filed: May 26, 1998

(51) Int. Cl.[7] .................................................. G06F 15/177

(52) U.S. Cl. ........................ 709/220; 709/221; 709/222; 710/10

(58) Field of Search ..................................... 709/220, 222, 709/221; 707/201, 203; 710/10

(56) References Cited

U.S. PATENT DOCUMENTS

| | | | |
|---|---|---|---|
| 5,652,841 | * 7/1997 | Nemirovsky et al. | 705/1 |
| 5,717,864 | * 2/1998 | Ide | 709/230 |
| 5,765,171 | * 6/1998 | Gehani et al. | 707/203 |
| 5,793,362 | * 8/1998 | Matthews et al. | 709/224 |
| 5,802,322 | * 9/1998 | Niblett | 709/251 |
| 5,872,928 | * 2/1999 | Lewis et al. | 709/222 |
| 5,964,838 | * 10/1999 | Cheung et al. | 709/224 |
| 5,968,116 | * 10/1999 | Day, II et al. | 709/202 |
| 5,999,712 | * 12/1999 | Moiin et al. | 709/220 |
| 6,014,669 | * 1/2000 | Slaughter et al. | 707/10 |
| 6,108,699 | * 8/2000 | Moiin | 709/221 |

OTHER PUBLICATIONS

Digital Equipment Corporatoin, OpenVMS Cluster Software, www.digital.com/info/QA00HF/QA00HFHM.HTM, May 1997.*

Compaq Computer Corporation, Compaq NonStop Integrity XC Cluster, www.tandem.com/prod_des/intgxcpd/intgxcpd.pdf, Sep. 1999.*

Digital Equipment Corporation, TruCluster Production Server Software Version 1.5, www.digital.com/info/QA00C5QA00C5/HM.HTM, Feb. 1998.*

Sequent Computer Systems, Inc., CommandPoint Clusters, www.sequent.com/products/software/sysmanagement/commandpointwp/cluster_wp.html, 1999.*

(List continued on next page.)

Primary Examiner—Zarni Maung
Assistant Examiner—Bradley Edelman
(74) Attorney, Agent, or Firm—Hamilton, Brook, Smith & Reynolds, P.C.

(57) ABSTRACT

A technique for sharing a resource among a cluster of devices in a computer network. The technique involves generating a vote count that includes votes from voting devices attempting to form a cluster until the vote count reaches a quorum. The technique further involves, when the quorum is reached, selecting a most advanced generation indicator from among the voting devices, advancing the selected generation indicator and storing the advanced selected generation indicator in memory as a cluster generation indicator. Upon the advanced selected generation indicator being stored in memory, the cluster is formed and includes the voting devices. The technique further involves sharing a resource among the voting devices after the cluster is formed.

38 Claims, 9 Drawing Sheets

OTHER PUBLICATIONS

"Designing Multi–Level Quorum Schemes for Highly Replicated Data". Freisleben, Koch, and Theel, Department of Computer Science, University of Darmstadt. IEEE pp. 154–159, 1991.*

"A Quroum–based Commit and Termination Protocol for Distributed Database Systems". Huang and Li, Department of Electrical Engineering, University of Southern California. IEEE pp. 136–143, 1988.*

"Evaluating Quorom Systems over the Internet". Amir and Wool, Department of Computer Science, Johns Hopkins University, and Department of Applied Mathematics and Computer Science, The Weizmann Institute of Science. IEEE pp. 26–35, 1996.*

* cited by examiner

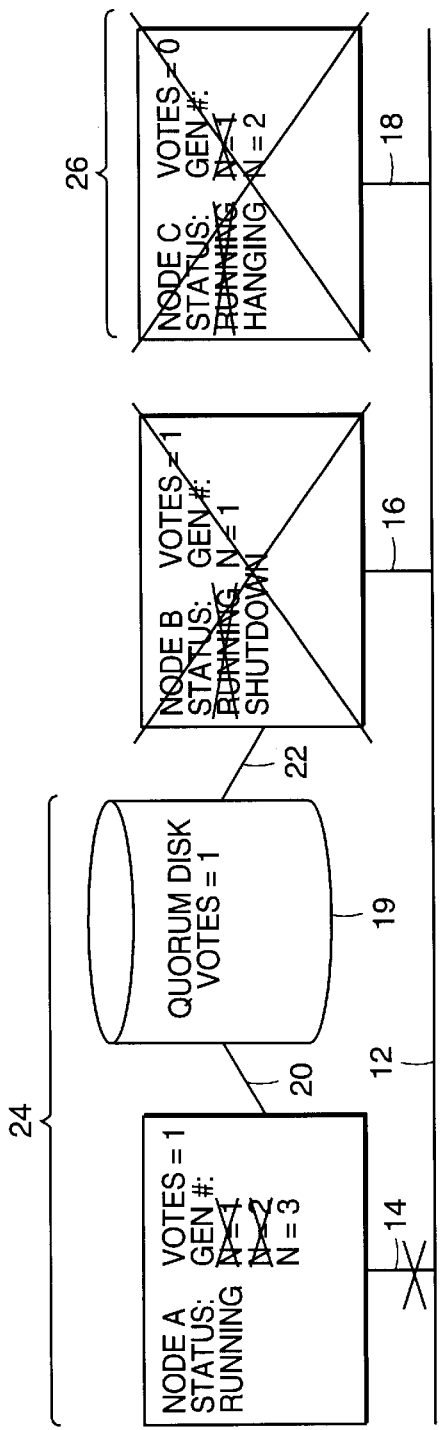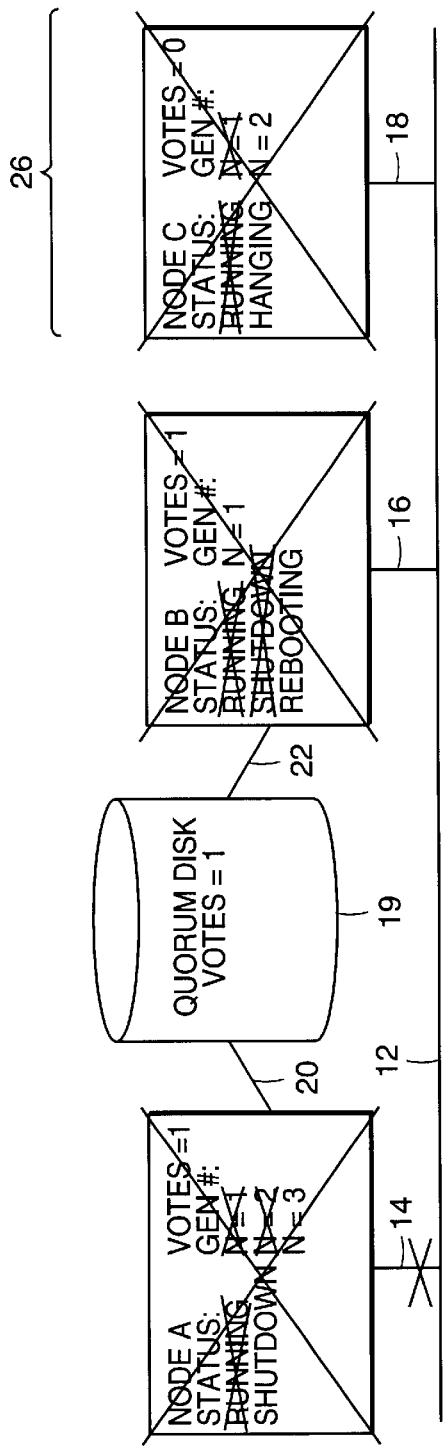

COMPUTER NETWORK CLUSTER GENERATION INDICATOR

FIELD OF THE INVENTION

This invention relates generally to device clustering, and more particularly to sharing a resource among devices of a cluster.

BACKGROUND OF THE INVENTION

A cluster is a group of devices that are connected together in a network. A typical cluster includes one or more devices that perform data processing operations (e.g., a mainframe), and one or more devices that do not perform data processing operations (e.g., a disk). The devices that perform data processing operations are considered processing devices or nodes, and the devices that do not perform data processing operations are considered non-processing devices.

It is common for the processing devices of a cluster to share one or more resources. When the processing devices share a resource, each processing device cooperates with the other processing devices to coordinate use of the shared resource. For example, the processing devices of a particular cluster may share a storage disk. The processing devices may cooperate with each other by coordinating access to storage locations on the storage disk.

Devices prefer to join clusters rather than form clusters. That is, when a processing device boots, the processing device attempts first to join a cluster if one exists, and if one does not exist, the processing device attempts alternatively to form a new cluster. Devices typically form a cluster by contributing votes to a cluster vote count. When the devices contribute enough votes so that the vote count reaches a threshold amount called a quorum, the devices form a cluster. Devices that contribute one or more votes are considered voting devices. Devices that contribute zero votes or devices that do not vote are considered non-voting devices. In general, a voting device of a cluster may be a processing device (e.g., a voting node) or a non-processing device (e.g., a quorum disk).

Quorum will now be discussed in further detail. Cluster administrators typically set the quorum of a cluster equal to more than one half of the total number of votes available to the cluster. That is, the cluster administrator generates a total number of votes available to the cluster by counting the votes provided by all of the devices that are configured to form or join the cluster. Then, the cluster administrator sets the quorum equal to a value that is greater than one half the generated total number.

The processing devices typically do not perform data processing operations until the cluster is formed, i.e., until the cluster vote count reaches quorum. Prior to formation of the cluster, the processing devices generally have limited operability such as the capability to boot, to contribute votes to the cluster vote count, and to transfer device information from one device to another. Once the cluster is formed, the processing devices perform data processing operations, and devices may join or leave the formed cluster. When a device joins the cluster, any votes of the joining device are added to the cluster vote count. Similarly, when a device leaves the formed cluster, any votes of the leaving device are removed from the cluster vote count. That is, the cluster recalculates the vote count when a device joins or leaves so that the vote count includes only the votes of the devices presently in the cluster.

When one or more devices leave the cluster and the cluster vote count is recalculated, it is possible for quorum to be lost. That is, the recalculated vote count may drop below quorum. When a cluster loses quorum, the devices remaining in the cluster enter a "hanging" state, and cease performing data processing operations. The devices do not resume data processing operations unless one or more devices join the cluster and contribute enough votes so that the vote count reaches quorum again. When quorum is restored to the cluster, the hanging processing devices complete any data processing operations that were left uncompleted.

Cluster partitioning will now be explained. A cluster may include two sets of devices that become disconnected from each other (e.g., due to a failure somewhere in the network). When disconnection occurs, each set becomes a separate cluster such that a first new cluster and a second new cluster exist simultaneously. That is, from the perspective of the first set of devices (the first new cluster), the devices of the second set have left the original cluster. Similarly, from the perspective of the second set (the second new cluster), the devices of the first set have left. Such separation of the original cluster into multiple new clusters is called cluster partitioning.

It should be understood that, in general, two partitioned clusters cannot perform data processing operations simultaneously. In particular, since quorum equals more than one half of the total votes available to the original cluster, only one of the two new clusters can have quorum at any given time. If the first set of devices has enough votes to maintain quorum, the second set will not have enough votes for quorum. In this situation, the first set continues to perform data processing operations while the second set hangs. Alternatively, if the second set of devices has enough votes to maintain quorum, the second set continues to perform data processing operations while the first set hangs. After partitioning, it is possible that neither of the two new clusters has enough votes to maintain quorum such that both new clusters hang.

Some clusters use generation numbers to track cluster operation. In such a cluster, the processing voting devices typically store a current cluster generation number in dedicated non-volatile memory locations (e.g, local non-volatile memory). When a processing voting device leaves the cluster, the remaining processing voting devices typically increment the cluster generation number, and store the incremented cluster generation number in place of the original cluster generation number. The processing voting device that leaves typically does not increment its cluster generation number and continues to store the original cluster generation number. Accordingly, the processing voting devices that remain in the cluster should always have a cluster generation number that is greater than or equal to that of a processing voting device that has left the cluster. If a cluster's current cluster generation number is less than that of a processing voting device that has not joined the cluster, the cluster has become operational inadvertently, and the cluster should be stopped from operating as quickly as possible (e.g., crashed) to avoid destroying cluster information.

When a processing voting device joins an already formed cluster, the processing voting device typically compares its stored generation number with the current cluster generation number (provided by a processing voting device of the cluster). If the stored generation number of the processing voting device is less than or equal to the current cluster generation number, the processing voting device typically joins the cluster and stores the current cluster generation number in place of its stored generation number. However, if the stored generation number of the processing voting device is greater than the current cluster generation number, the processing voting device sends a signal to the cluster indicating that its generation number is higher than the current generation number of the cluster. The processing devices of the cluster generally crash when the cluster receives the signal so that any damaging data processing operations performed by the processing devices of the cluster are discontinued.

Examples of clusters include OpenVMS clusters and UNIX TruClusters made by Digital Equipment Corporation of Maynard, Massachusetts, clusters made by Sequent Computer Systems, Inc. of Beaverton, Oregon, and clusters made by Tandem Computers of Austin, Texas.

Some conventional clusters are susceptible to cluster partitioning into multiple new clusters. Subsequent operation of such new clusters at different times can destroy cluster information on a shared resource in some situations.

SUMMARY OF THE INVENTION

Partitioning a conventional cluster into two new clusters that operate at different times may result in a loss of cluster information. In particular, the results of data processing operations, which are performed by one of the two new clusters and stored on a shared resource, may be overwritten by the results of data processing operations performed by the other new cluster. As will be discussed later, a preferred embodiment of the invention avoids such a loss of cluster information by associating generation indicators with cluster votes, and using the indicators to prevent such new clusters from operating at different times.

First, a situation will be described in which a conventional cluster is partitioned into two new clusters that operate at different times such that cluster information on a shared resource is destroyed. When an original cluster is partitioned into a first new cluster and a second new cluster (e.g., due to a failure in the network), the first new cluster may retain quorum and continue performing data processing operations for a period of time, while the second new cluster loses quorum and hangs. The data processing operations may update data on a shared resource such as a voting quorum disk. Then, the first new cluster may lose quorum and the second new cluster may obtain quorum. For example, in the first new cluster, a processing device having access to the quorum disk may be shutdown such that the first new cluster loses quorum. Shortly thereafter, another processing device having access to the quorum disk may join the second new cluster so that the second new cluster obtains quorum. Once the second new cluster obtains quorum, the second new cluster begins performing data processing operations including completing any data processing operations that had been left uncompleted when partitioning of the original cluster occurred. Completion of the uncompleted operations may overwrite results generated by the first new cluster that reside on the quorum disk thus destroying cluster information.

Cluster information can be lost even if cluster generation numbers are used. For example, suppose the processing device that attempts to join the second new cluster is a voting device having a stored generation number. If the device is in a "shutdown" state when partitioning of the original cluster occurs, the device should have a generation number that is less than that of the original cluster, and that of the two new clusters (since the cluster generation number is incremented when the shutdown device leaves the original cluster). When the device attempts to join the second new cluster, the device compares its generation number with the cluster generation number of the second new cluster and determines that its generation number is less than that of the second new cluster. Accordingly, the device is permitted to join the second new cluster thereby allowing the second new cluster to regain quorum and overwrite cluster information generated by the first new cluster.

In contrast, a preferred embodiment of the present invention is directed to a technique for sharing a resource among a cluster of devices. The technique prevents cluster information from being destroyed when the cluster is partitioned into two new clusters where one of the new clusters maintains quorum and continues to operate. The technique involves associating a generation indicator with each device that provides a vote. As such, if a new cluster resulting from a partitioned original cluster obtains votes that potentially allow it to regain quorum, the new cluster also obtains an associated generation indicator. The new cluster can determine from that associated generation indicator that partitioning occurred and that the new cluster should not perform data processing operations that could damage cluster information. In particular, the new cluster crashes to prevent any subsequent damaging operations from occurring.

In the preferred embodiment, the technique involves generating a vote count that includes votes from voting devices attempting to form a cluster until the vote count reaches a quorum. The quorum is preferably equal to more than one half of a total number of votes available to the cluster. When the quorum is reached, the technique involves writing a cluster generation indicator in a local memory of each voting device. At least one voting device is a non-processing voting device (e.g., a quorum disk). A cluster is formed that includes the voting devices when the cluster generation indicator is written in the local memory of each voting device. The technique further involves sharing a resource among the voting devices after the cluster is formed.

Preferably, the generation indicator is advanced by the cluster whenever a device leaves and quorum is maintained, or whenever quorum is obtained. The generation indicator may be a number that is advanced by incremention. Any voting device wishing to join the cluster must compare the cluster generation indicator with its own generation indicator. If the cluster generation indicator is equal to or more advanced than its own generation indicator, the voting device is permitted to join the cluster. If not, the devices of the cluster crash.

Since the cluster generation indicator is stored with each voting device, partitioning of the cluster into multiple new clusters does not allow subsequent operation of the new clusters at different times resulting in damaged or destroyed cluster information. Rather, if a first new cluster maintains quorum after partitioning, it advances the cluster generation indicator (since devices have left the cluster) and continues to perform data processing operations. The advanced generation indicator is stored in each voting device of the first new cluster. If the first new cluster is shutdown and a voting device of the first new cluster (e.g., a quorum disk) attempts to join the second new cluster, the voting device must compare its generation indicator (i.e., the advanced generation indicator) with the generation indicator of the second new cluster. The generation indicator of the second new cluster is less than the advanced generation indicator of the joining device. Accordingly, the second new cluster crashes, and cluster information is preserved. Hence, the second new cluster is prevented from performing data processing operations that would overwrite cluster information.

In the present invention, the original cluster may include voting devices and non-voting devices. Writing the cluster generation indicator may involve storing the indicator in the local memory of each voting device and a local memory of at least one non-voting device. Writing the indicator to at least one non-voting device increases the availability of the indicator to devices wishing to obtain it. Alternatively, writing may involve storing the cluster generation indicator in the local memory of each voting device while excluding non-voting devices from storing the cluster generation indicator. This minimizes the number of store operations performed by the devices as a whole during cluster formation, and may allow the cluster to be formed more quickly.

Preferably, when a voting device leaves the cluster and the quorum is maintained, the technique involves advancing the cluster generation indicator, storing the advanced cluster generation indicator in the local memory of each voting device remaining in the cluster, and preventing each voting device remaining in the cluster from further sharing the resource until the advanced cluster generation indicator is stored in the local memory of each voting device remaining in the cluster. Preventing the resource from being shared until the indicator is stored guarantees that each voting device has a correct generation indicator before data processing operations continue. The advanced indicator is an indication to devices that subsequently join the cluster that a device has left the cluster.

According to another embodiment, the technique involves generating a vote count that includes votes from voting devices attempting to form a cluster until the vote count reaches a quorum. When the quorum is reached, the technique involves selecting a most advanced generation indicator from among the voting devices, advancing the selected generation indicator and storing the advanced selected generation indicator in memory as a cluster generation indicator. A cluster is formed that includes the voting devices when the advanced selected generation indicator is stored in memory. The technique further involves sharing a resource among the voting devices after the cluster is formed.

Preferably, each voting device includes a local memory. As such, storing the advanced selected generation indicator in memory involves writing the indicator in the local memory of each voting device. In particular, the local memory of each voting device may include a non-volatile memory, and writing the indicator may involve storing the indicator in the non-volatile memory of the local memory of each voting device. Accordingly, the voting devices can retain the indicators even if they lose power.

One or more of the voting devices may be a non-processing voting device, and writing the advanced selected generation indicator may involve storing the indicator in the local memory of each non-processing voting device. In particular, at least one of the non-processing voting devices may be a voting storage device (a quorum disk), and writing the indicator may include storing the indicator in the local memory of each voting storage device.

Preferably, formation of the cluster is blocked until the advanced selected generation indicator is written into the local memory of each voting device. This guarantees that each voting device has a correct indicator before data processing operations begin.

As in the preferred embodiment, the formed cluster may include voting devices and non-voting devices. Writing the advanced selected generation indicator may involve storing the advanced selected generation indicator in the local memory of each voting device and a local memory of at least one non-voting device. Alternatively, writing the indicator may involve storing the advanced selected generation indicator in the local memory of each voting device while excluding non-voting devices from storing the indicator.

Preferably, when a voting device leaves the cluster and the quorum is maintained, the technique involves advancing the cluster generation indicator, storing the advanced cluster generation indicator in memory, and preventing each voting device remaining in the cluster from further sharing the resource until the advanced cluster generation indicator is stored in memory.

Furthermore, before the step of generating, the quorum is preferably set equal to more than one half of a total number of votes available to the cluster.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 1A–1E are block diagrams of devices that form clusters using conventional cluster formation techniques.

DETAILED DESCRIPTION OF THE INVENTION

Figure 1A:
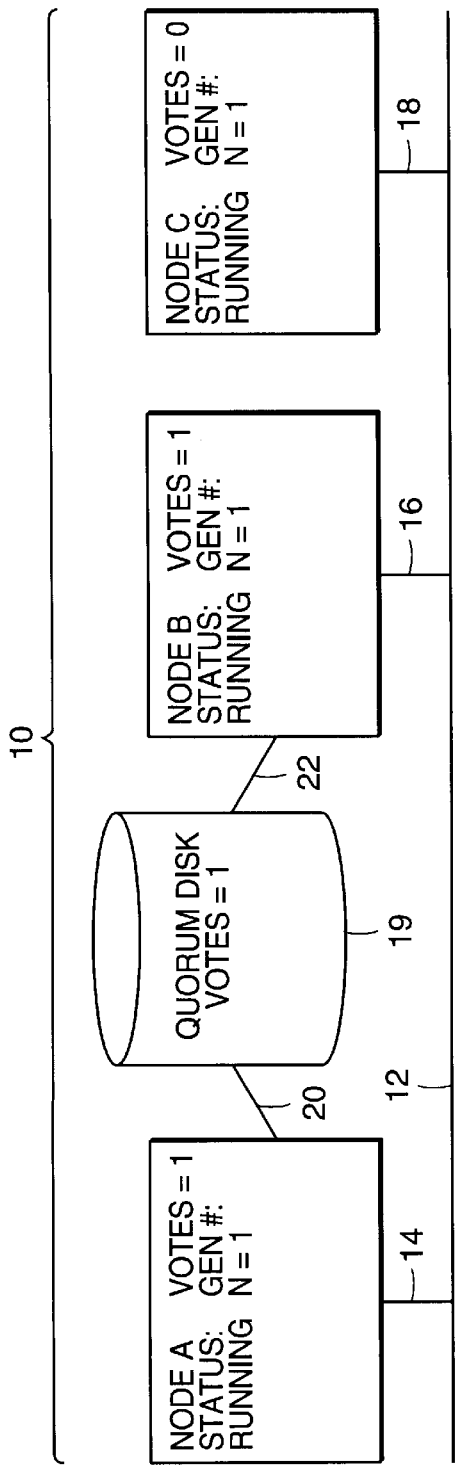

FIG. 1A shows a conventional cluster 10 that includes a network connection 12, processing devices NODE A, NODE B and NODE C, and a quorum disk 19. NODE A connects with the network connection 12 through line 14. Similarly, NODE B and NODE C connect with the network connection 12 through line 16 and line 18, respectively. The processing devices communicate (e.g., contribute votes to form the cluster 10) through the network connection 12. NODE A further connects with the quorum disk 19 through line 20. Similarly, NODE B connects with the quorum disk 19 through line 22. The quorum disk 19 is a resource that is shared among the processing devices.

NODE A, NODE B and the quorum disk 19 are voting devices and have one vote each. NODE C is a non-voting processing device. The quorum disk 19 contributes its vote through either NODE A or NODE B. Thus, the total number of votes available is 3. Accordingly, quorum is set to be greater than one half the total number of votes. In this example, quorum is set equal to 2. Each processing device further includes a generation number N that initially is equal to 1.

As shown in FIG. 1A, the cluster 10 has quorum (i.e., the vote count is 3, there being 1 vote from each of NODE A, NODE B and the quorum disk 19) and is fully operational. That is, each processing device (NODE A, NODE B and NODE C) is considered to be in a "running" state and is performing data processing operations.

Figure 1B:
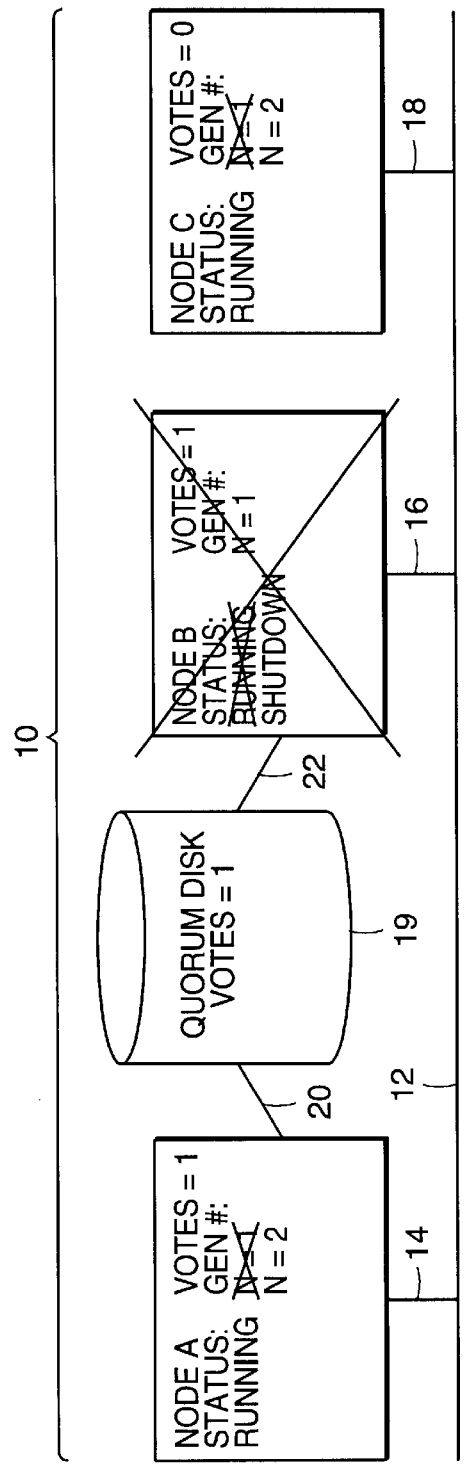

Then for example, NODE B is shutdown, as shown in FIG. 1B. The "X" through NODE B indicates that NODE B is no longer performing data processing operations. When NODE B is shutdown, the cluster 10 recalculates the vote count to include votes only from devices remaining in the cluster 10. Accordingly, the vote count equals 2 (1 vote from each of NODE A and the quorum disk 19), and quorum is retained. Hence, the remaining processing devices, NODE A and NODE C, continue to perform data processing operations.

Additionally, when NODE B leaves the cluster 10, the cluster 10 increments the generation number N so that it equals 2. This is illustrated in FIG. 1B with N being shown as changed in value from 1 to 2. NODE B does not increment its generation number N which remains at 1 since NODE B is leaving the cluster.

Suppose that a failure occurs in line 14 so that NODE A loses its connection with the network connection 12, as shown in FIG. 1C. Such a failure causes the cluster 10 to become partitioned into two new clusters. In particular, NODE A and the quorum disk 19 are devices belonging to a first new cluster 24, and NODE C is a device belonging to a second new cluster 26. That is, from the perspective of NODE A and the quorum disk 19, NODE C has left the original cluster 10. Similarly, from the perspective of NODE C, NODE A and the quorum disk have left the original cluster 10.

When this or such partitioning occurs, the first new cluster 24 recalculates a vote count. The vote count of the first new cluster 24 equals 2 (one vote from NODE A and one vote from the quorum disk 19). Accordingly, quorum is maintained and the cluster generation number N is incremented from 2 to 3 to reflect the departure of NODE C from the cluster, as illustrated in FIG. 1C. NODE A is allowed to continue performing data processing operations since the cluster 24 has quorum.

In a similar manner, the second new cluster 26 recalculates a vote count. The vote count of the second new cluster 26 equals zero. Accordingly, the second new cluster 26 does not have quorum, and NODE C hangs. The "X" through NODE C indicates that NODE C no longer performs data processing operations. In particular, data processing operations that were in the process of being performed by NODE C when partitioning occurred remain uncompleted. Furthermore, NODE C does not increment its generation number N.

Figure 1E:
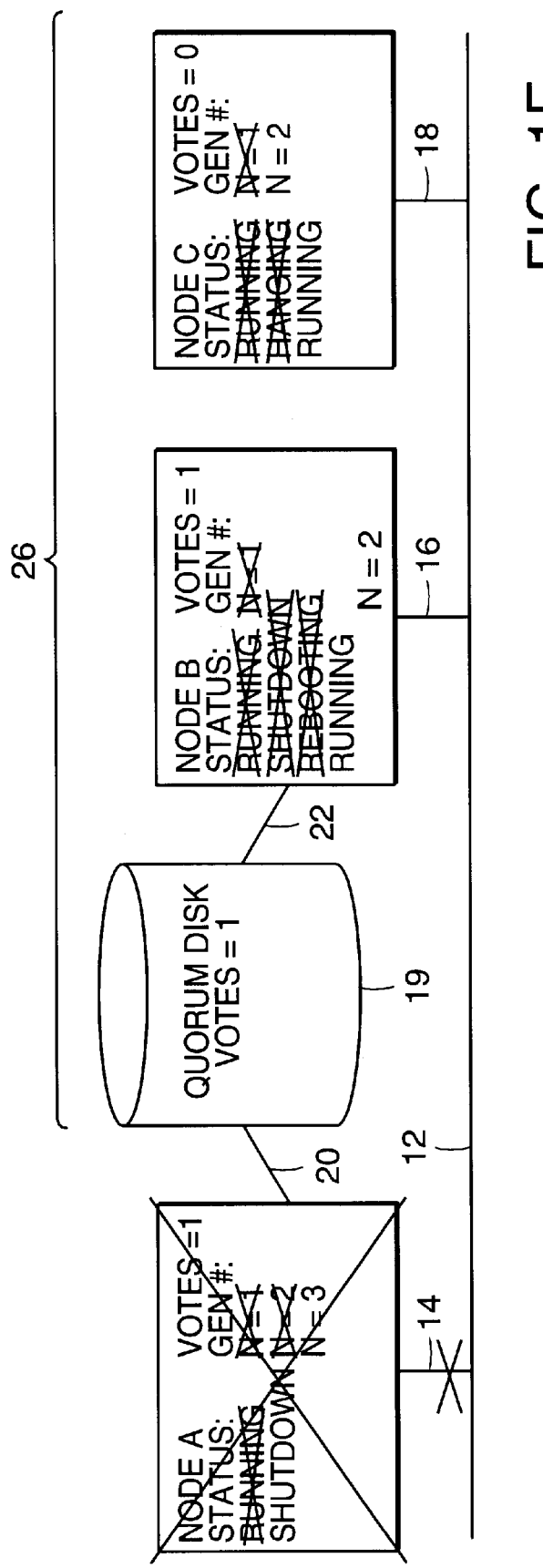

Suppose then that NODE A is shutdown so that line 14 can be repaired, and NODE B is rebooted so that services provided by the processing devices can continue (i.e., so that data processing operations can be performed), as shown in FIG. 1D. NODE B sees the second new cluster 26 and attempts to join it. In particular, NODE B compares its generation number (N=1) with the generation number of the second new cluster 26 (N=2). Since the generation number of NODE B is less than that of the second new cluster 26, NODE B is allowed to join the cluster. Accordingly, NODE B contributes its vote to the vote count of the second new cluster 26 so that the vote count equals 1. Similarly, the quorum disk 19, which is connected with NODE B through line 22, contributes its vote to the vote count so that the total vote count equals 2. When the vote count reaches 2, quorum is achieved and the second new cluster 26 begins performing data processing operations, as shown in FIG. 1E. In particular, NODE C which had been in a hanging state re-enters a running state and completes the data processing operations that were left uncompleted when partitioning occurred.

The sequence of events described above and shown in FIGS. 1A–1E results in the partitioning of a cluster 10 into multiple new clusters 24 and 26, and subsequent operation of the new clusters 24 and 26 at different times. Such operation can destroy cluster information residing on a shared resource (e.g., data on the quorum disk 19). In particular, the first new cluster 24 can store data processing results on the quorum disk 19 at a first time (FIG. 1C). Then, the second new cluster 26 can overwrite those results at a later time (FIG. 1E) thus destroying the data stored by the first new cluster 24.

For example, if the processing devices are banking computers, NODE C may have been in the middle of recording a particular transaction for a particular bank account on the quorum disk 19 when the failure in line 14 occurred. The particular transaction is left uncompleted since NODE C hangs (see FIG. 1C). The first new cluster 24 including NODE A and the quorum disk 19 continues to record banking transactions such that banking service is not interrupted. The particular transaction left uncompleted by NODE C can be re-entered in NODE A so that the transaction is recorded. Other transactions such as transactions for the same bank account can be performed at NODE A. When NODE A is removed from service and the second new cluster 26 is put in service (see FIG. 1E), NODE C completes uncompleted data processing operations including the uncompleted particular transaction. As a result, the bank account information on the quorum disk 19 is damaged (e.g., the correct bank account balance is overwritten or the same transaction is recorded twice).

In a preferred embodiment of the present invention, each voting device includes a generation indicator that is used to track cluster operation. Unlike conventional clusters, each non-processing voting device (e.g., a quorum disk) includes a generation indicator. According to the preferred embodiment, if a new cluster results from a partitioned original cluster and obtains votes that potentially allow it to regain quorum, the new cluster also obtains an associated generation indicator. The new cluster determines from that associated generation indicator that partitioning occurred and that the new cluster should not perform data processing operations that could damage cluster information. Accordingly, the new cluster crashes to prevent any subsequent damaging operations from occurring.

Figure 2:
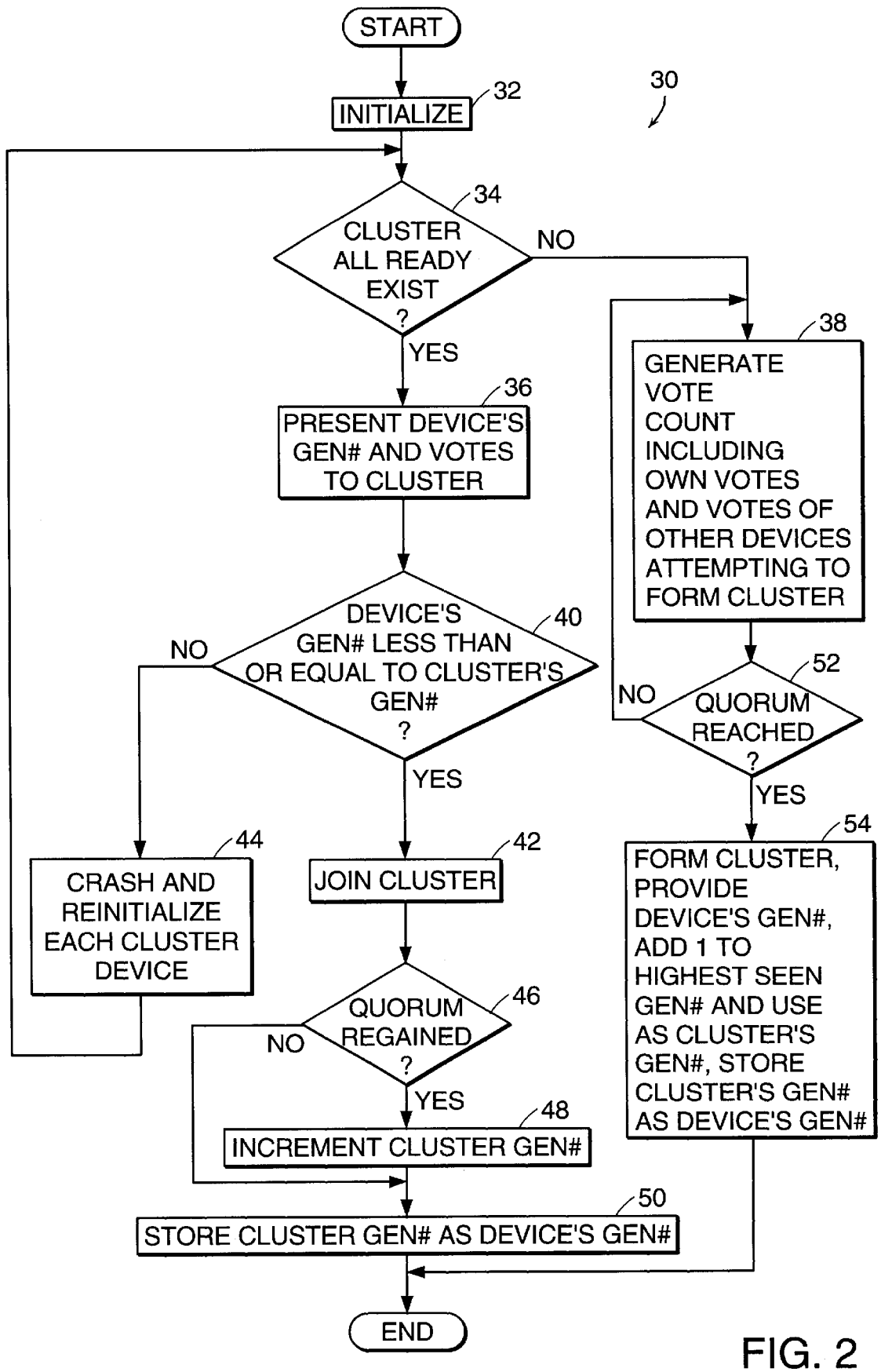
FIG. 2 is a flow diagram of a method performed by voting devices when the voting devices initialize, according to the present invention.

FIG. 2 illustrates a method 30 used by voting devices as they become available to form or join a cluster, according to an embodiment of the present invention. The method 30 is performed by processing voting devices such as a mainframe, and non-processing voting devices such as a quorum disk. In step 32, the voting device initializes itself, and proceeds to step 34. For example, if the voting device is a mainframe, it runs a booting procedure. In step 34, the voting device determines whether a cluster all ready exists. If a cluster all ready exists, the voting device proceeds to step 36 to attempt to join the existing cluster. If no cluster exists, the voting device proceeds to step 38 to attempt to form a cluster.

In step 36 (cluster all ready exists), the voting device presents its generation indicator (e.g., a generation number GEN#) and votes to the cluster, and proceeds to step 40. In step 40, the voting device determines whether the generation indicator of the voting device is less advanced than or equal to a cluster generation indicator of the existing cluster. If the generation indicator is less advanced than or equal to the cluster's, step 40 proceeds to step 42. Otherwise, step 40 proceeds to step 44. In step 42, the voting device joins the cluster, and proceeds to step 46. In step 46, the cluster including the voting device determines whether quorum is regained. If quorum is regained, the cluster generation indicator is advanced (e.g., the cluster generation number is incremented) in step 48. If quorum is not regained, the cluster generation number is not advanced and step 48 is skipped. Next, in step 50, the voting device stores the cluster generation indicator as its generation indicator. In particular, the voting device stores the indicator in local non-volatile memory.

In connection with step 38, which follows step 34 when a cluster does not exist, the voting device generates a vote count including its votes and votes of any other devices that are attempting to form a cluster, and proceeds to step 52. In step 52, the voting device determines whether quorum is reached. If not, the voting device returns to step 38 because it must wait for one or more other voting devices to contribute votes so that quorum is reached. If quorum is reached, step 52 proceeds to step 54. In step 54, the voting device forms a cluster with the other devices. Furthermore, the voting device provides its generation indicator to the other devices so that the devices forming the cluster select the most advanced generation indicator (e.g., the highest generation number). The most advanced generation indicator is advanced (e.g., the generation number is incremented), and the advanced generation number is considered the cluster's generation indicator. Each voting device of the cluster stores the cluster generation indicator in local non-volatile memory.

In connection with step 44, which follows step 40 when the voting device's generation indicator is more advanced than the cluster's generation indicator, the voting device sends a signal to the cluster indicating that its generation indicator is more advanced. The cluster responds by crashing to prevent any damaging operations from continuing. Preferably, the voting devices subsequently reinitialize and proceed to step 34 to form a cluster again.

Figure 3:
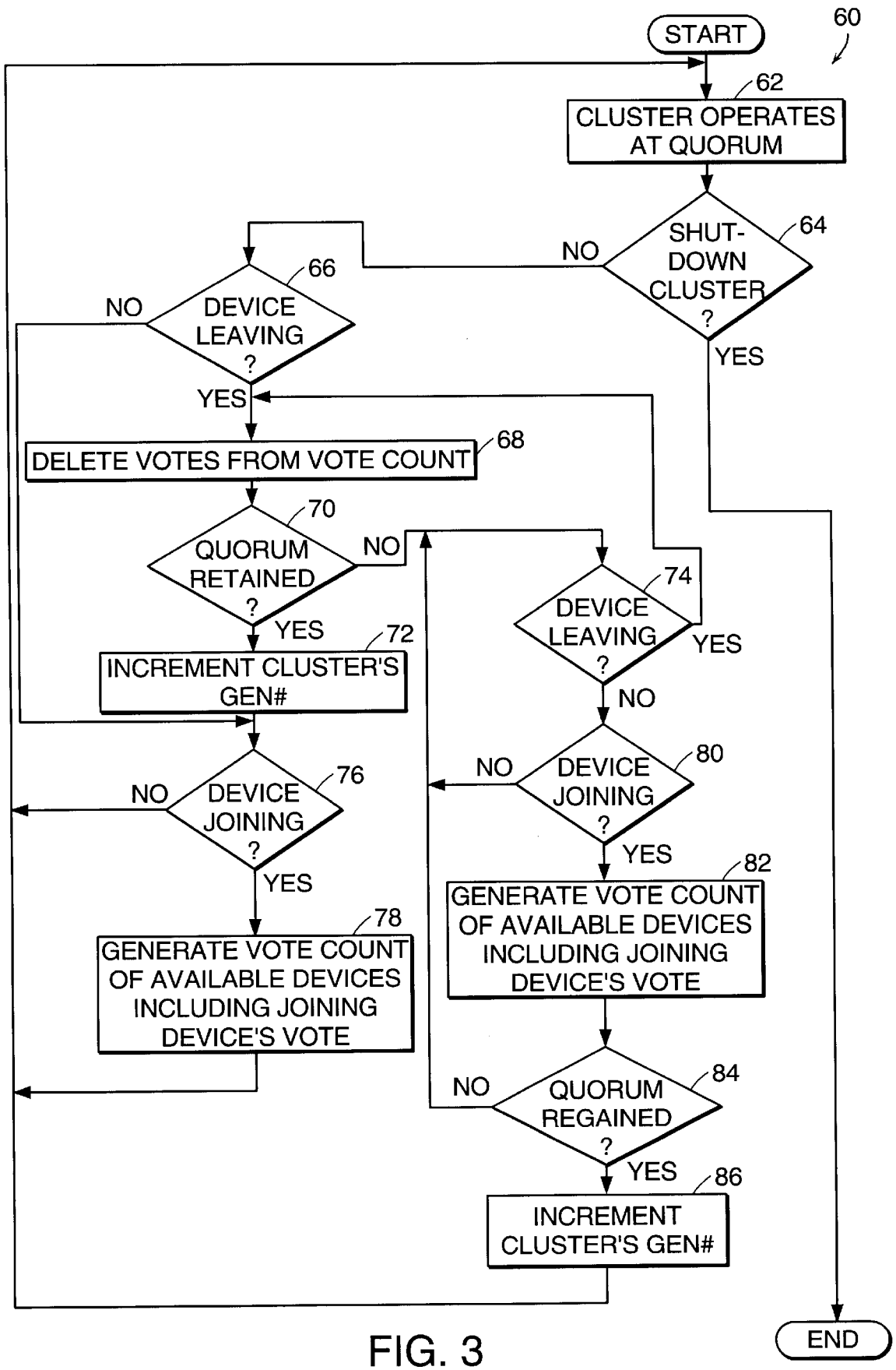
FIG. 3 is a flow diagram of a method performed by voting devices of a cluster after a cluster has been formed, according to the present invention.

FIG. 3 illustrates a method 60 describing the operation of a cluster after it has been formed (i.e., after the cluster vote count has reached quorum), according to an embodiment of the present invention. In step 62, the cluster operates at quorum (i.e., the cluster performs data processing operations), and proceeds to step 64. If a shutdown command is received by the cluster, in step 64, the cluster shuts down. Otherwise, the cluster remains operational and proceeds to step 66. In step 66, if a voting device is leaving, the cluster proceeds to step 68. If no voting device is leaving, the cluster proceeds to step 76. In step 68, the votes of the leaving voting device are deleted from the cluster vote count. In particular, the cluster recalculates the vote count to include only votes from voting devices remaining in the cluster, and proceeds to step 70. In step 70, the cluster determines whether quorum is maintained. If so, the cluster proceeds to step 72. If not, the cluster proceeds to step 74.

In step 72, when quorum is maintained after a voting device leaves the cluster, the cluster advances the cluster generation indicator, and stores it in memory. For example, if the cluster generation indicator is a cluster generation number, the cluster increments the number. Step 72 then proceeds to step 76 which determines whether a voting device is joining the cluster. If no voting device is joining the cluster, step 76 proceeds back to step 62. If a voting device joins the cluster, step 76 proceeds to step 78. In step 78, the cluster includes the votes of the joining voting device in the cluster vote count, and proceeds to step 62. That is, the cluster recalculates the vote count to include the votes of all devices in the cluster including the joining device.

In step 74, which follows step 70 when quorum is lost due to a voting device leaving the cluster, the cluster determines whether another device is leaving. If so, step 74 returns to step 68 so that the votes of the other voting device are also deleted from the vote count. If multiple devices leave the cluster, the cluster may loop through steps 68, 70 and 74 multiple times. If no other device is leaving, step 74 proceeds to step 80. In step 80, the cluster determines whether a voting device is joining the cluster. If not, step 80 returns to step 74. If a device is joining, step 80 proceeds to step 82. In step 82, the cluster adds the votes of the joining device to the cluster vote count, and proceeds to step 84. In step 84, the cluster determines whether quorum is regained. If the vote count is still below quorum, step 84 proceeds to step 74. If quorum is regained, the cluster advances the cluster generation indicator, and stores it in memory (e.g., increments the cluster generation number), and returns to step 62.

Optionally, non-voting devices may store generation indicators to increase the availability of the indicator to other devices. If a non-voting device is configured to store a generation indicator in local memory, the non-voting device operates according to the method 30 (and method 60 when belonging to a cluster) in a manner similar to that of voting devices. In particular, non-voting devices that store generation indicators operate according to the method 30 in FIG. 2, except that they contribute zero votes.

It should be understood that each voting device stores a generation indicator, and operates according to the method 30, and method 60 when joined with a cluster. Accordingly, a non-processing voting device such as a quorum disk operates according to the method 30 to store and update a locally stored generation indicator (see steps 48 and 54). Hence, if a cluster is partitioned into two new clusters, the movement of a non-processing voting device such as a quorum disk from one of the new clusters to another new cluster carries with it a generation indicator. Thus, if the new cluster obtains votes from a voting device that earlier belonged to a different new cluster, it also obtains that voting device's associated generation indicator. The new cluster uses that indicator to determine that partitioning occurred. Then, the new cluster crashes to prevent unintended operation that would possibly destroy cluster information (e.g., data on the quorum disk).

This feature of the invention will be more apparent when described by way of example with reference to FIGS. 4A–4G. A cluster 90 includes a network connection 92, processing devices NODE A, NODE B and NODE C, and a quorum disk 99. NODE A connects with the network connection 92 through line 94. Similarly, NODE B and NODE C connect with the network connection 92 through line 96 and line 98, respectively. The processing devices communicate (e.g., contribute votes to form the cluster 90) through the network connection 92. NODE A further connects with the quorum disk 99 through line 100. Similarly, NODE B connects with the quorum disk 99 through line 102. The quorum disk 99 is a resource that is shared among the processing devices.

Each processing device includes processing circuitry 120, memory 122 and network circuitry 124. The memory 122 includes local non-volatile memory (e.g., magnetic disk memory). In one embodiment, the memory 122 of the processing devices includes one or more programs having code for performing the methods 30 and 60 (see FIGS. 2 and 3). In another embodiment, the code for performing the methods 30 and 60 is centrally stored in a location separate from the processing devices (e.g., the quorum disk 99).

Additionally, the quorum disk 99 includes processing circuitry 126, and some local memory 128. The processing circuitry 126 allows the quorum disk 99 to perform certain functions such as a self-test, and diagnostics. The local memory 128 is memory dedicated to quorum disk 99.

NODE A, NODE B and the quorum disk 99 are voting devices having one vote each. Each voting device stores a cluster generation indicator G. By way of example, the cluster generation indicator G is a cluster generation number. NODE C is a non-voting processing device. NODE C optionally may include the cluster generation indicator G to increase the availability of indicator G. The quorum disk 99 contributes its vote through either NODE A or NODE B. The total number of votes available is 3 (1 vote from each of NODE A, NODE B and the quorum disk 99). Quorum is set to be greater than one half the total number of votes. In this example, quorum is set equal to 2. The cluster generation indicator G of each processing device is initially set equal to 1, and stored in each device's local memory 122A, 122B, 122C and 128.

Figure 4A:
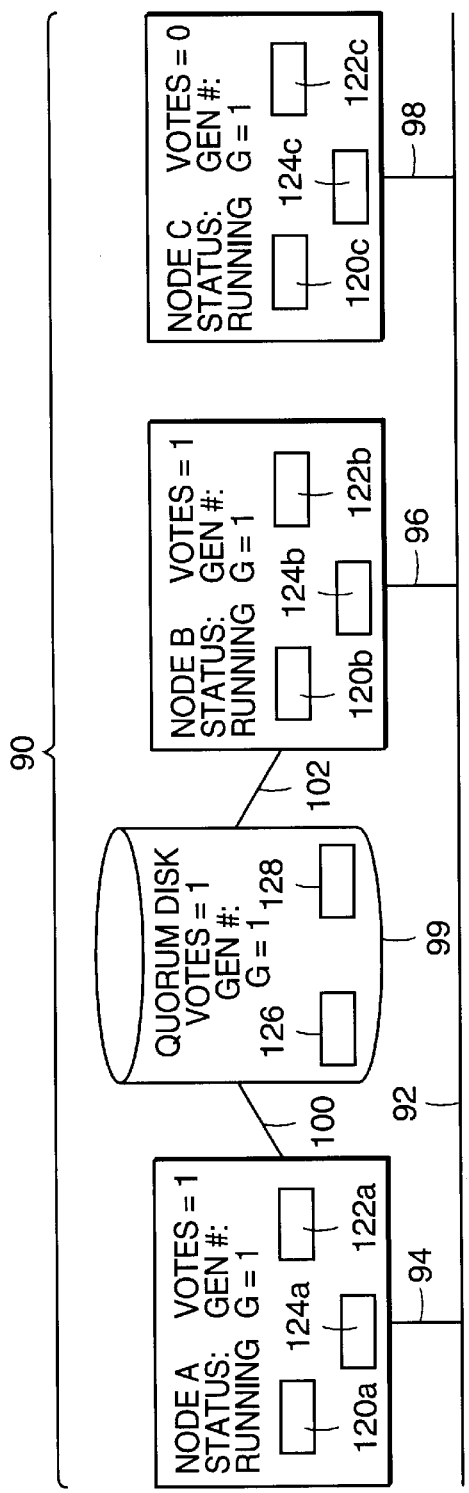
FIGS. 4A–4G are block diagrams of devices that form clusters, using the methods of FIGS. 2 and 3 according to the present invention.

As shown in FIG. 4A, the cluster 90 has quorum (i.e., the vote count is 3) and is fully operational (see step 62 in FIG. 3). Accordingly, each processing device (NODE A, NODE B and NODE C) is in the "running" state and performs data processing operations. The voting devices (NODE A, NODE B and quorum disk 99) and NODE C (since NODE C includes a generation indicator) operate according to the method 30 (see FIG. 2), and the cluster 90 operates according to the method 60 (see FIG. 3).

Figure 4B:
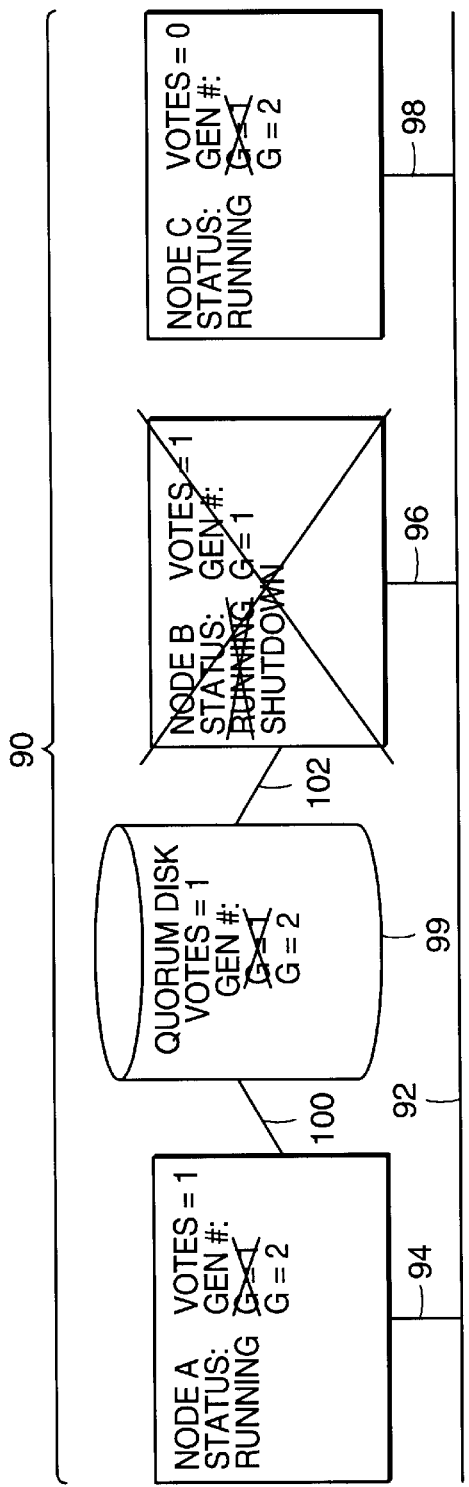

At some time, NODE B for example is shutdown, as shown in FIG. 4B. When NODE B is shutdown, NODE B leaves the cluster 90 (see step 66 in FIG. 3), and the cluster 90 recalculates the cluster vote count to include votes only from devices remaining in the cluster 90 (see step 68 in FIG. 3). The "X" through NODE B in FIG. 4B indicates that NODE B no longer performs data processing operations. The recalculated vote count equals 2 (1 from each of Node A and Q Disk 99), and quorum is retained. As a result, the cluster generation indicator is advanced such that G in NODE A, NODE C and the quorum disk 99 equals 2 (see step 72 in FIG. 3). In particular, the generation indicator is advanced and stored in the local memory 122A, 122C and 128 of each remaining voting device and optionally the remaining non-voting devices, and data processing operations are blocked until such storing is complete. Once storage of the indicator is complete, the remaining processing devices, NODE A and NODE C, continue to perform data processing operations. NODE B does not increment its generation number G which remains at 1 since NODE B has left the cluster 90.

Figure 4C:
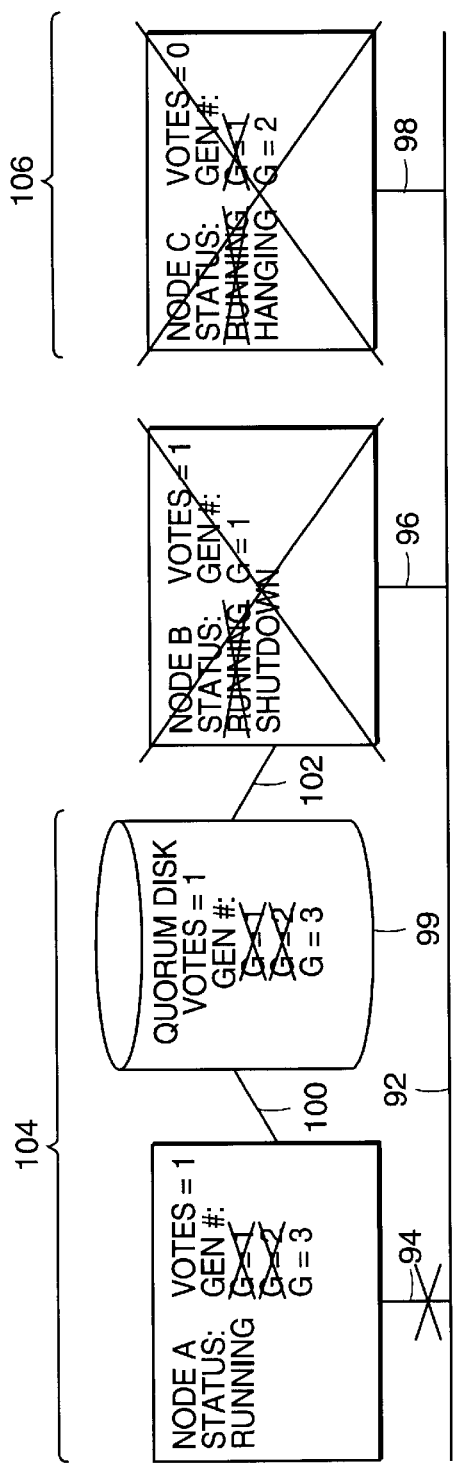

Next in the example, the connection between NODE A and the network connection 92 fails. For example, the network adaptor 124A malfunctions, or line 94 becomes disconnected, as shown in FIG. 4C. At this time, the cluster 90 becomes partitioned into two new clusters, namely a first new cluster 104 and a second new cluster 106. That is, from the perspective of NODE A and the quorum disk 99, NODE C leaves the original cluster 90. The first new cluster 104 responds to the partitioning of the cluster 90 by deleting any votes contributed by NODE C (see step 68 in FIG. 3). Since NODE C contributes zero votes, no votes are deleted from the cluster vote count. That is, the cluster vote count includes all the votes of the devices currently in the cluster, namely one vote from NODE A and one vote from the quorum disk 99. Accordingly, the cluster vote count for the first new cluster 104 is 2 and quorum is retained. As a result, the cluster generation indicator G of each device (NODE A and the quorum disk 99) is advanced (i.e., the cluster generation number G is incremented to 3), and stored in each device's local memory (i.e., local memory 122A and 128).

Similarly, the second new cluster 106 recalculates its cluster vote count when it detects NODE A and the quorum disk 99 leaving the cluster (see FIG. 3, step 68). The recalculated cluster vote count of the second new cluster 106 is zero which is below quorum, so NODE C hangs (see FIG. 3, steps 70, 74, 80, 82 and 84). Note that the cluster generation indicator for NODE C is not advanced since the second new cluster 106 loses quorum and hangs.

Figure 4D:
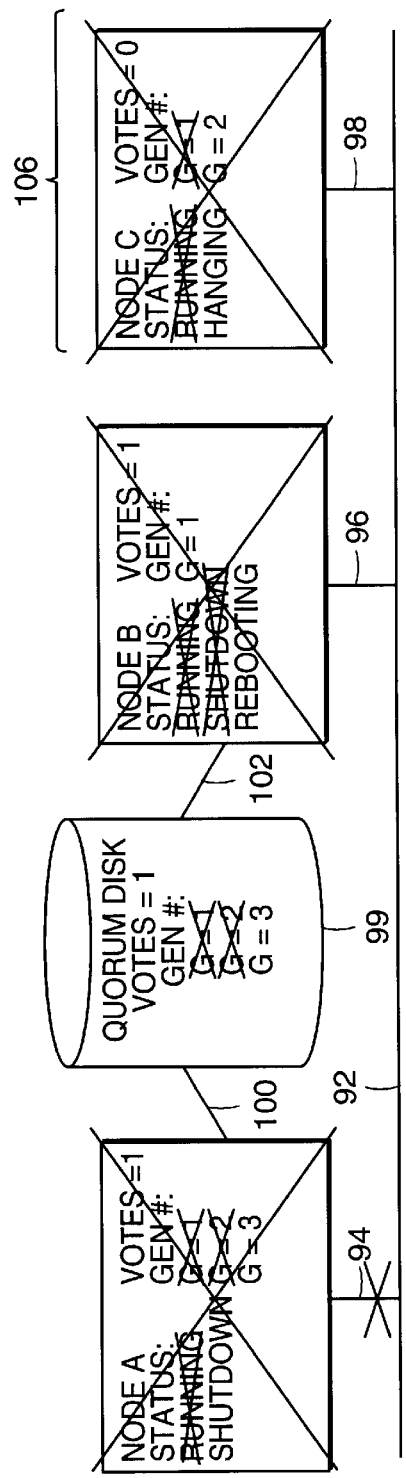
Figure 4E:
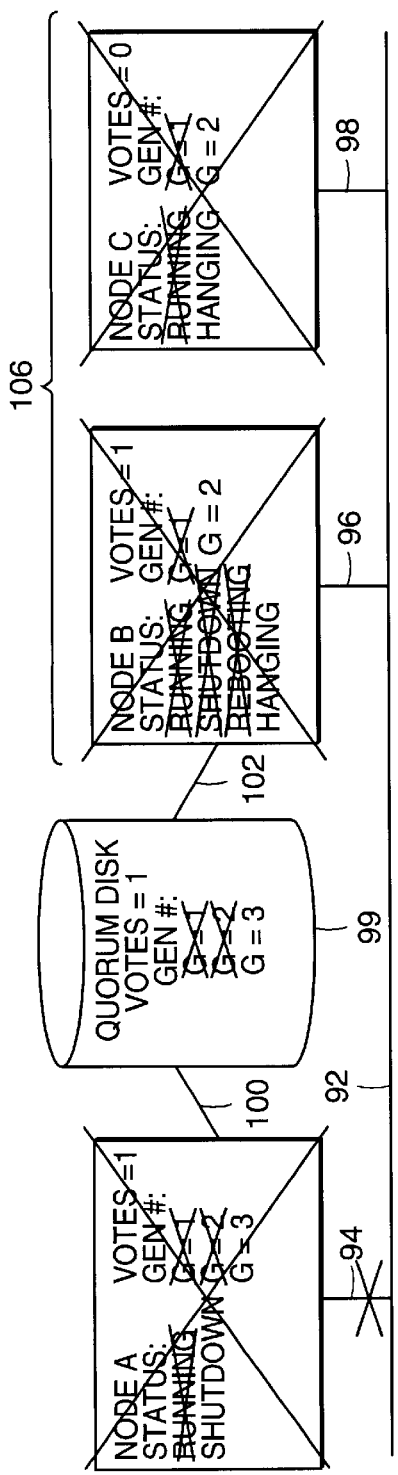

Suppose that the cluster administrator shuts down the cluster 104 so that the connection between NODE A and the network connection 92 can be repaired. Also suppose that NODE B is rebooted. FIG. 4D illustrates this situation. After NODE B initializes (see step 32 of FIG. 2), NODE B determines whether a cluster all ready exists (see step 34). NODE B detects the existence of the second new cluster 106, and presents its generation indicator (G=1) to the second new cluster 106. Since the NODE B's generation indicator is less than that of the second new cluster 106 (G=2), NODE B joins the second new cluster 106 (see FIG. 2, steps 40 and 42). The second new cluster 106 now has a vote count of 1, and quorum is not achieved (see step 46 in FIG. 2, and steps 80, 82 and 84 in FIG. 3). Accordingly, NODE B and NODE C hang, as shown in FIG. 4E. Additionally, NODE B stores the cluster generation indicator (G=2) as its new cluster generation indicator (FIG. 2, step 50).

Figure 4F:
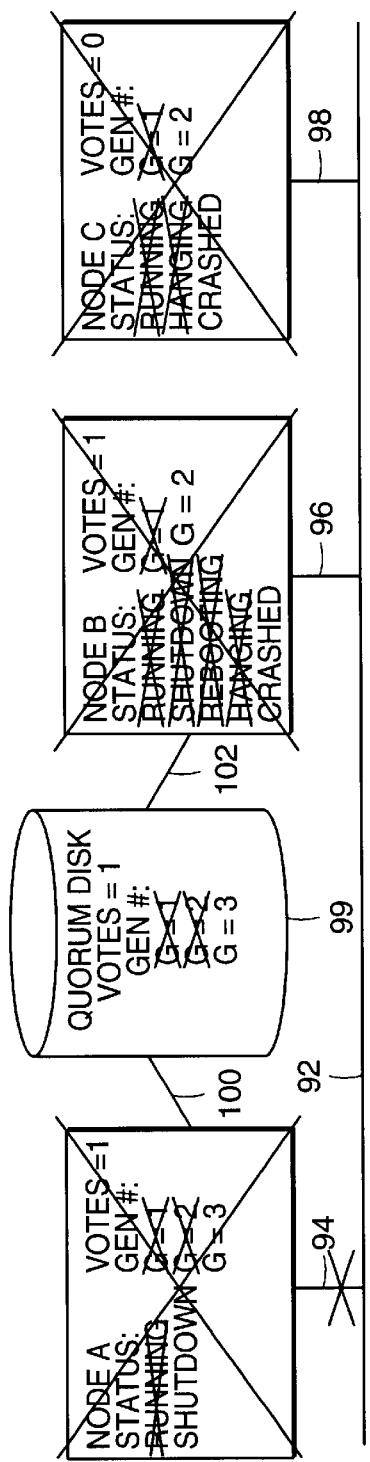
Figure 4G:
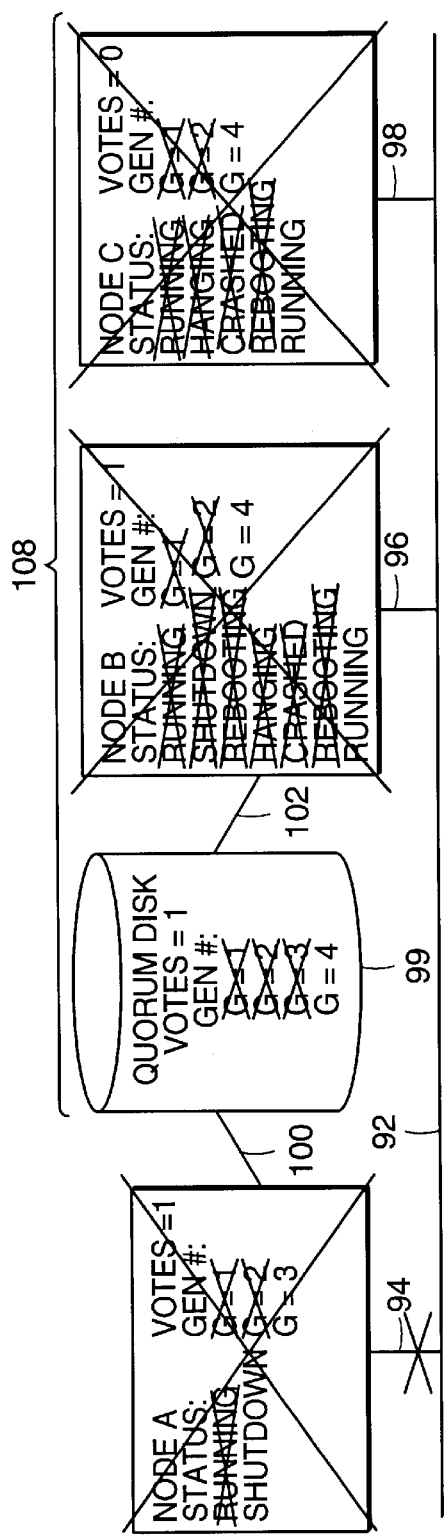

The quorum disk 99 is connected to NODE B through line 102. Accordingly, the quorum disk 99 contributes its vote to the second new cluster 106 as well. In particular, the quorum disk initializes (FIG. 2, step 32), sees that a cluster 106 all ready exists (FIG. 2, step 34) and presents its vote and generation indicator to the second new cluster 106 (FIG. 2, step 36). The second new cluster 106 determines that the generation indicator G of the quorum disk 99 (G=3) is more advanced than that of the second new cluster (G=2). Accordingly, quorum disk 99 crashes the cluster devices, namely NODE B and NODE C, as shown in FIG. 4F. Any operations that were uncompleted by NODE C when the original cluster 90 was partitioned are lost, rather than completed. Hence, there is no overwriting of cluster information residing on the shared resource (quorum disk 99) by the second new cluster 106 devices (NODE B and NODE C).

It should be understood that, unlike the situation in FIGS. 1A–1E where no generation indicator is associated with the vote of the quorum disk 19, a generation indicator is associated with the vote of the quorum disk 99 (see FIGS. 4A–4G). Accordingly, the second new cluster 106 is able to determine that cluster partitioning has occurred and that a cluster other than the second new cluster 106 had operated using the quorum disk 99 prior to the quorum disk 99 becoming available to the second new cluster 106. Once this situation is detected, the second new cluster 99 crashes (see FIG. 4F) to avoid running inadvertently (as shown in FIG. 1E).

Although the example describes NODE B attempting to join the second new cluster 106 before the quorum disk 99, both devices could attempt to join together, or the quorum disk 99 could attempt to join first. The same end result would be reached in either situation. In particular, it would be determined that the generation indicator of the quorum disk 99 was more advanced than that of the second new cluster 106. Accordingly, the second new cluster 106 would crash to remove any possibility of performing data processing operations that would destroy cluster information on the shared resource.

NODE B and NODE C may then re-initialize (reboot) and form a different new cluster 108 and resume data processing operations without risk of damaging cluster information, as shown in FIG. G. That is, NODE B initializes and determines that a cluster 108 now consists only of the quorum disk 99 (FIG. 2, steps 32 and 34). NODE B presents its generation number which is currently G=2. The cluster 108 compares the cluster generation number (G=3 from the quorum disk 99) to NODE B's generation number (G=2) and allows NODE B to join the cluster 108 (FIG. 2, step 42) since NODE B's generation number is less than the cluster generation number. The votes are counted to see if quorum is regained (FIG. 2, step 46). In this case, the vote count equals 2, there being 1 vote from the quorum disk 99 and 1 vote from NODE B. Thus, quorum is regained and the generation number is incremented from 3 to 4 (FIG. 2, step 48). The quorum disk 99 and NODE B (i.e., each of the devices in the currently existing cluster) store G=4 in respective local memories 122B, 128 (FIG. 2 step 50). Similarly, NODE C joins cluster 108 by asserting a generation number (G=2) which is less than the cluster generation number which equals 4 at this time (FIG. 2, steps 34, 36, 40 and 42). NODE C stores G=4 in local memory 122C (FIG. 2, step 50) and cluster 108 operates with NODE B and NODE C.

Alternatively, the quorum disk 99 alone may not belong to any cluster when NODE B and NODE C crash. In this situation, NODE B, NODE C and the quorum disk 99 contribute votes to a vote count (1 vote from NODE B, zero votes from NODE C, and 1 vote from the quorum disk 99) that equals 2 (FIG. 2, step 38). Then, the devices determine that quorum is reached (FIG. 2, step 52), and form the cluster 108 (FIG. 2, step 54). The devices find the highest generation number (the quorum disk 99 has G equal to 3), advance the highest generation number (G=4), and store the highest generation number in their respective memories (122B, 122C and 128).

Thus, the present invention provides a method and apparatus for stopping a partitioned cluster such that processing operations are not performed which would destroy cluster information on a shared resource.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

For example, the generation indicator was described in terms of a number that is advanced through incrementation. Advancement through decrementation is also suitable. Alternatively, the generation indicator can be an ordered sequence of symbols or codes that is advanced by changing the current symbol or code to the next symbol or code in the sequence.

Additionally, hardware configurations other than that shown in FIGS. 4A–4G are suitable for the invention. For example, the processing devices in FIGS. 4A–4G are shown as general purpose computers. The processing devices may be other types of computing devices such as super-computing devices, distributed systems, and specialized transaction devices (e.g., banking or teller machines). Similarly, the network connection 92 may have topologies (e.g., token ring or mesh) other than the simple backbone structure shown in FIGS. 4A–4G. Such modifications to the structure shown in FIGS. 4A–4G are intended to be within the scope of the invention.

Furthermore, the resource that is shared among cluster devices in the hardware configuration shown in FIGS. 4A–4G is a non-processing voting device (quorum disk 99). The shared resource does not need to be a voting device. A non-voting resource may be shared as well. For example, the resource may be a non-voting device such as a storage disk without votes. The invention prevents multiple new clusters resulting from an original partitioned cluster from operating at different times on such a resource to prevent cluster information from being destroyed.

What is claimed is:

1. In a computer network, a method for sharing a resource among a cluster of devices, the method comprising the steps of:

generating a vote count that includes votes from voting devices attempting to form a cluster until the vote count reaches a quorum;

generating a generation indicator and storing the generation indicator in each processing and non-processing voting device;

when the quorum is reached, selecting a most advanced generation indicator from among the voting devices, advancing the selected generation indicator and storing the advanced selected generation indicator in memory as a cluster generation indicator, forming a cluster that includes the voting devices upon the advanced selected generation indicator being stored in memory, such that the cluster generation indicators are associated with cluster votes and the cluster is able to determine from the selected generation indicator that the cluster has been partitioned; and sharing a resource among the voting devices after such cluster is formed.

2. The method of claim 1, wherein each voting device includes a local memory, and wherein the step of selecting, advancing and storing includes the step of:

writing the advanced selected generation indicator in the local memory of each voting device.

3. The method of claim 2, wherein the local memory of each voting device includes a non-volatile memory, and wherein the step of writing includes the step of:

storing the advanced selected generation indicator in the non-volatile memory of the local memory of each voting device.

4. The method of claim 2, wherein at least one of the voting devices is a non-processing voting device, and wherein the step of writing includes the step of:

storing the advanced selected generation indicator in the local memory of each non-processing voting device.

5. The method of claim 4, wherein at least one non-processing voting device is a voting storage device, and wherein the step of storing the advanced selected generation indicator in the local memory of each non-processing voting device includes the step of:

storing the advanced selected generation indicator in the local memory of each voting storage device.

6. The method of claim 2, wherein the step of selecting, advancing and storing further includes the step of:

blocking formation of the cluster until the advanced selected generation indicator is written into the local memory of each voting device.

7. The method of claim 2, wherein the cluster includes voting devices and non-voting devices, and wherein the step of writing includes the step of:

storing the advanced selected generation indicator in the local memory of each voting device while excluding non-voting devices from storing the advanced selected generation indicator.

8. The method of claim 2, wherein the cluster includes voting devices and non-voting devices, and wherein the step of writing includes the step of:

storing the advanced selected generation indicator in the local memory of each voting device and a local memory of at least one non-voting device.

9. The method of claim 1, further comprising the step of:

when a voting device leaves the cluster and the quorum is maintained, advancing the cluster generation indicator, storing the advanced cluster generation indicator in memory, and preventing each voting device remaining in the cluster from further sharing the resource until the advanced cluster generation indicator is stored in memory.

10. In a computer network, a method for sharing a resource among a cluster of devices, the method comprising the steps of:

generating a vote count that includes votes from voting devices attempting to form a cluster until the vote count reaches a quorum;

when the quorum is reached, writing a cluster generation indicator in a local memory of each voting device, at least one voting device being a non-processing voting device, a cluster being formed that includes the voting devices when the cluster generation indicator is written in the local memory of each voting device, such that the cluster generation indicators are associated with cluster votes and the cluster is able to determine from a selected generation indicator that the cluster has been partitioned; and sharing a resource among the voting devices after the cluster is formed.

11. The method of claim 10, wherein the cluster includes voting devices and non-voting devices, and wherein the step of writing includes the step of:

storing the cluster generation indicator in the local memory of each voting device while excluding non-voting devices from storing the cluster generation indicator.

12. The method of claim 10, wherein the cluster includes voting devices and non-voting devices, and wherein the step of writing includes the step of:

storing the cluster generation indicator in the local memory of each voting device and a local memory of at least one non-voting device.

13. The method of claim 10, further comprising the step of:

when a voting device leaves the cluster and the quorum is maintained, advancing the cluster generation indicator, storing the advanced cluster generation indicator in the local memory of each voting device remaining in the cluster, and preventing each voting device remaining in the cluster from further sharing the resource until the advanced cluster generation indicator is stored in the local memory of each voting device remaining in the cluster.

14. The method of claim 10, further comprising:

before the step of generating, setting the quorum equal to more than one half of a total number of votes available to the cluster.

15. In a computer network, a system for sharing a resource among a cluster of devices, comprising:

a shareable resource; and a plurality of voting devices, each voting device having a local memory, the voting devices including code for:

generating a vote count that includes respective votes from voting devices attempting to form a cluster until the vote count reaches a quorum;

generating a generation indicator and storing the generation indicator in each processing and non-processing voting device;

when the quorum is reached, selecting a most advanced generation indicator from among the voting devices that attempted to form the cluster, advancing the selected generation indicator and storing the advanced selected generation indicator in the local memory of at least one voting device as a cluster generation indicator, a cluster being formed that includes the voting devices that attempted to form the cluster when the advanced selected generation indicator is stored in the local memory of the at least one voting device, such that the cluster generation indicators are associated with cluster votes and the cluster is able to determine from the selected generation indicator that the cluster has been partitioned; and sharing the shareable resource among the at least one voting device after the cluster is formed.

16. The system of claim 15, wherein the code includes instructions for storing the advanced selected generation indicator in the local memory of each voting device that attempted to form the cluster, the cluster being formed when the advanced selected generation indicator is stored in the local memory of each voting device that attempted to form the cluster.

17. The system of claim 16, wherein the local memory of each voting device includes a non-volatile memory, and wherein the instructions for storing include instructions for writing the advanced selected generation indicator in the non-volatile memory of the local memory of each voting device.

18. The system of claim 16, wherein at least one of the voting devices is a non-processing voting device, and wherein the instructions for storing includes instructions for writing the advanced selected generation indicator in the local memory of each non-processing voting device.

19. The system of claim 18, wherein at least one non-processing voting device is a voting storage device, and wherein the instructions for writing the advanced selected generation indicator in the local memory of each non-processing voting device includes instructions for storing the advanced selected generation indicator in the local memory of each voting storage device.

20. The system of claim 16, wherein the code includes instructions for blocking formation of the cluster until the advanced selected generation indicator is written into the local memory of each voting device.

21. The system of claim 16, further comprising:

a plurality of non-voting devices, wherein the cluster includes voting devices and non-voting devices, and wherein the code includes instructions for storing the advanced selected generation indicator in the local memory of each voting device while excluding non-voting devices from storing the advanced selected generation indicator.

22. The system of claim 16, further comprising:

a plurality of non-voting devices, wherein the cluster includes voting devices and non-voting devices, and wherein the code includes instructions for storing the advanced selected generation indicator in the local memory of each voting device and a local memory of at least one non-voting device.

23. The system of claim 15, wherein the code includes instructions for, when a voting device leaves the cluster and the quorum is maintained, advancing the cluster generation indicator, storing the advanced cluster generation indicator in memory, and preventing each voting device remaining in the cluster from further sharing the resource until the advanced cluster generation indicator is stored in memory.

24. In a computer network, a system for sharing a resource among a cluster of devices, comprising:
   a shareable resource; and
   a plurality of voting devices, each voting device having a local memory, the voting devices including code for:
      generating a vote count that includes votes from voting devices attempting to form a cluster until the vote count reaches a quorum;
      when the quorum is reached, writing a cluster generation indicator in the local memory of each voting device that attempted to form the cluster, at least one voting device being a non-processing voting device, a cluster being formed that includes the voting devices that attempted to form the cluster when the cluster generation indicator is written in the local memory of each voting device that attempted to form the cluster; and
      sharing the shareable resource among the voting devices that attempted to form the cluster after the cluster, such that the cluster generation indicators are associated with cluster votes and the cluster is able to determine from the selected generation indicator that the cluster has been partitioned is formed.

25. The system of claim 24, further comprising:
   a plurality of non-voting devices wherein the cluster includes voting devices and non-voting devices, and wherein the code includes instructions for storing the cluster generation indicator in the local memory of each voting device while excluding non-voting devices from storing the cluster generation indicator.

26. The system of claim 24, further comprising:
   a plurality of non-voting devices, wherein the cluster includes voting devices and non-voting devices, and wherein the code includes instructions for storing the cluster generation indicator in the local memory of each voting device and a local memory of at least one non-voting device.

27. The system of claim 24, wherein the code includes instructions for, when a voting device leaves the cluster and the quorum is maintained, advancing the cluster generation indicator, storing the advanced cluster generation indicator in the local memory of each voting device remaining in the cluster, and preventing each voting device remaining in the cluster from further sharing the resource until the advanced cluster generation indicator is stored in the local memory of each voting device remaining in the cluster.

28. The system of claim 24, wherein the code includes instructions for setting the quorum equal to more than one half of a total number of votes available to the cluster before generating the vote count.

29. In a computer network, a method for sharing a resource among a cluster of devices, the cluster including at least one non-processing voting storage device, the method comprising the steps of:
   generating a vote count that includes votes from voting devices attempting to form a cluster until the vote count reaches a quorum;
   generating a generation indicator and storing the generation indicator in each voting device;
   when the quorum is reached, selecting a most advanced generation indicator from among the voting devices, advancing the selected generation indicator, storing the advanced selected generation indicator in memory as a cluster generation indicator, a cluster being formed that includes the voting devices when the advanced selected generation indicator is stored in memory, and storing the advanced selected generation indicator in a local memory of each non-processing voting storage device, such that the cluster generation indicators are associated with cluster votes and the cluster is able to determine from the selected generation indicator that the cluster has been partitioned; and
   sharing a resource among the voting devices after the cluster is formed.

30. In a computer network, a method for sharing a resource among a cluster of devices, the cluster including voting devices and non-voting devices, the method comprising the steps of:
   generating a vote count that includes votes from voting devices attempting to form a cluster until the vote count reaches a quorum;
   generating a generation indicator and storing the generation indicator in each voting device;
   when the quorum is reached, selecting a most advanced generation indicator from among the voting devices, advancing the selected generation indicator, storing the advanced selected generation indicator in memory as a cluster generation indicator, a cluster being formed that includes the voting devices when the advanced selected generation indicator is stored in memory, and storing the advanced selected generation indicator in a local memory of each voting device while either a) excluding non-voting devices from storing the advanced selected generation indicator or b) storing the advanced selected generation indicator in the local memory of at least one non-voting device, such that the cluster generation indicators are associated with cluster votes and the cluster is able to determine from the selected generation indicator that the cluster has been partitioned; and
   sharing a resource among the voting devices after the cluster is formed.

31. In a computer network, a method for sharing a resource among a cluster of devices, the method comprising the steps of:
   generating a vote count that includes votes from voting devices attempting to form a cluster until the vote count reaches a quorum;
   generating a generation indicator and storing the generation indicator in each voting device;
   when the quorum is reached, selecting a most advanced generation indicator from among the voting devices, advancing the selected generation indicator and storing the advanced selected generation indicator in memory as a cluster generation indicator, a cluster being formed that includes the voting devices when the advanced selected generation indicator is stored in memory, such that the cluster generation indicators are associated with cluster votes and the cluster is able to determine from the selected generation indicator that the cluster has been partitioned;
   when a voting device leaves the cluster and the quorum is maintained, advancing the cluster generation indicator, storing the advanced cluster generation indicator in memory, and preventing each voting device remaining in the cluster from further sharing the resource until the advanced cluster generation indicator is stored in memory; and sharing a resource among the voting devices after the cluster is formed.

32. In a computer network, a method for sharing a resource among a cluster of devices, the cluster including voting devices and non-voting devices, the method comprising the steps of:

generating a vote count that includes votes from voting devices attempting to form a cluster until the vote count reaches a quorum;

when the quorum is reached, writing a cluster generation indicator in a local memory of each voting device, at least one voting device being a non-processing voting device, while either a) excluding non-voting devices from storing the cluster generation indicator or b) storing the advanced selected generation indicator in the local memory of at least one non-voting device, a cluster being formed that includes the voting devices when the cluster generation indicator is written in the local memory of each voting device, such that the cluster generation indicators are associated with cluster votes and the cluster is able to determine from a selected generation indicator that the cluster has been partitioned; and sharing a resource among the voting devices after the cluster is formed.

33. In a computer network, a method for sharing a resource among a cluster of devices, the method comprising the steps of:

generating a vote count that includes votes from voting devices attempting to form a cluster until the vote count reaches a quorum;

when the quorum is reached, writing a cluster generation indicator in a local memory of each voting device, at least one voting device being a non-processing voting device, a cluster being formed that includes the voting devices when the cluster generation indicator is written in the local memory of each voting device;

when a voting device leaves the cluster and the quorum is maintained, advancing the cluster generation indicator, storing the advanced cluster generation indicator in the local memory of each voting device remaining in the cluster, and preventing each voting device remaining in the cluster from further sharing the resource until the advanced cluster generation indicator is stored in the local memory of each voting device remaining in the cluster such that the cluster generation indicators are associated with cluster votes and the cluster is able to determine from a selected generation indicator that the cluster has been partitioned; and sharing a resource among the voting devices after the cluster is formed.

34. In a computer network, a system for sharing a resource among a cluster of devices, the cluster including at least one non-processing voting storage device, comprising:

a shareable resource; and a plurality of voting devices, each voting device having a local memory, the voting devices including code for:

generating a vote count that includes respective votes from voting devices attempting to form a cluster until the vote count reaches a quorum;

generating a generation indicator and storing the generation indicator in each voting device;

when the quorum is reached, selecting a most advanced generation indicator from among the voting devices that attempted to form the cluster, advancing the selected generation indicator and storing the advanced selected generation indicator in the local memory of each non-processing voting storage device that attempted to form the cluster, as a cluster generation indicator, a cluster being formed that includes the voting devices that attempted to form the cluster when the advanced selected generation indicator is stored in the local memory of each voting device that attempted to form the cluster, such that the cluster generation indicators are associated with cluster votes and the cluster is able to determine from the selected generation indicator that the cluster has been partitioned; and sharing the shareable resource among the at least one voting device after the cluster is formed.

35. In a computer network, a system for sharing a resource among a cluster of devices, the cluster including voting and non-voting devices and at least one non-processing voting storage device, comprising:

a shareable resource; and a plurality of voting devices, each voting device having a local memory, the voting devices including code for:

generating a vote count that includes respective votes from voting devices attempting to form a cluster until the vote count reaches a quorum;

generating a generation indicator and storing the generation indicator in each voting device;

when the quorum is reached, selecting a most advanced generation indicator from among the voting devices that attempted to form the cluster, advancing the selected generation indicator and storing the advanced selected generation indicator in the local memory of each voting device that attempted to form the cluster, as a cluster generation indicator, while either a) excluding non-voting devices from storing the advanced selected generation indicator or b) storing the advanced selected generation indicator in the local memory of each voting device and a local memory of at least one non-voting device, a cluster being formed that includes the voting devices that attempted to form the cluster when the advanced selected generation indicator is stored in the local memory of each voting device that attempted to form the cluster, such that the cluster generation indicators are associated with cluster votes and the cluster is able to determine from the selected generation indicator that the cluster has been partitioned; and sharing the shareable resource among the at least one voting device after the cluster is formed.

36. In a computer network, a system for sharing a resource among a cluster of devices, comprising:

a shareable resource; and a plurality of voting devices, each voting device having a local memory, the voting devices including code for:

generating a vote count that includes respective votes from voting devices attempting to form a cluster until the vote count reaches a quorum;

generating a generation indicator and storing the generation indicator in each voting device;

when the quorum is reached, selecting a most advanced generation indicator from among the voting devices that attempted to form the cluster, advancing the selected generation indicator and storing the advanced selected generation indicator in the local memory of at least one voting device as a cluster generation indicator, a cluster being formed that includes the voting devices that attempted to form the cluster when the advanced selected generation indicator is stored in the local memory of the at least one voting device, such that the cluster generation indicators are associated with cluster votes and the cluster is able to determine from the selected generation indicator that the cluster has been partitioned;

when a voting device leaves the cluster and the quorum is maintained, advancing the cluster generation indicator, storing the advanced cluster generation indicator in memory, and preventing each voting device remaining in the cluster from further sharing the resource until the advanced cluster generation indicator is stored in memory; and sharing the shareable resource among the at least one voting device after the cluster is formed.

37. In a computer network, a system for sharing a resource among a cluster of devices, the cluster including voting devices and non-voting devices, comprising:

a shareable resource; and a plurality of voting devices, each voting device having a local memory, the voting devices including code for:

generating a vote count that includes votes from voting devices attempting to form a cluster until the vote count reaches a quorum;

when the quorum is reached, writing a cluster generation indicator in the local memory of each voting device that attempted to form the cluster, at least one voting device being a non-processing voting device, while either a) excluding non-voting devices from storing the cluster generation indicator or b) storing the cluster generation indicator in the local memory of each voting device and a local memory of at least one non-voting device, a cluster being formed that includes the voting devices that attempted to form the cluster when the cluster generation indicator is written in the local memory of each voting device that attempted to form the cluster, such that the cluster generation indicators are associated with cluster votes and the cluster is able to determine from a selected generation indicator that the cluster has been partitioned; and sharing the shareable resource among the voting devices that attempted to form the cluster after the cluster is formed.

38. In a computer network, a system for sharing a resource among a cluster of devices, comprising:

a shareable resource; and a plurality of voting devices, each voting device having a local memory, the voting devices including code for:

generating a vote count that includes votes from voting devices attempting to form a cluster until the vote count reaches a quorum;

when the quorum is reached, writing a cluster generation indicator in the local memory of each voting device that attempted to form the cluster, at least one voting device being a non-processing voting device, a cluster being formed that includes the voting devices that attempted to form the cluster when the cluster generation indicator is written in the local memory of each voting device that attempted to form the cluster;

when a voting device leaves the cluster and the quorum is maintained, advancing the cluster generation indicator, storing the advanced cluster generation indicator in the local memory of each voting device remaining in the cluster, and preventing each voting device remaining in the cluster from further sharing the resource until the advanced cluster generation indicator is stored in the local memory of each voting device remaining in the cluster, such that the cluster generation indicators are associated with cluster votes and the cluster is able to determine from a selected generation indicator that the cluster has been partitioned; and sharing the shareable resource among the voting devices that attempted to form the cluster after the cluster is formed.

\* \* \* \* \*